United States Patent
Ray et al.

(10) Patent No.: US 9,734,109 B2
(45) Date of Patent: Aug. 15, 2017

(54) MULTI-CHANNEL, SELECTABLE IDENTITY TAGGING DATA TRANSLATOR AND METHOD

(71) Applicant: Raytheon Company, Waltham, MA (US)

(72) Inventors: Michael S. Ray, Carmel, IN (US); David J. Broadhead, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 220 days.

(21) Appl. No.: 14/494,164

(22) Filed: Sep. 23, 2014

(65) Prior Publication Data
US 2016/0085712 A1    Mar. 24, 2016

(51) Int. Cl.
| | | |
|---|---|---|
| G06F 3/00 | (2006.01) |
| G06F 5/00 | (2006.01) |
| G06F 13/00 | (2006.01) |
| G06F 13/36 | (2006.01) |
| G06F 15/16 | (2006.01) |
| G06F 13/40 | (2006.01) |
| G06F 13/42 | (2006.01) |
| G06F 13/38 | (2006.01) |

(52) U.S. Cl.
CPC ........ G06F 13/4068 (2013.01); G06F 13/385 (2013.01); G06F 13/4221 (2013.01); *G06F 2213/0052* (2013.01)

(58) Field of Classification Search
CPC .... G06F 13/122; G06F 13/126; G06F 13/387; G06F 11/2247; H04L 25/05; H04L 69/329; H04L 69/08

USPC ......... 710/5, 36, 52, 8, 3, 33, 38, 10, 21, 9, 710/308; 709/232, 227, 228

See application file for complete search history.

(56) References Cited

U.S. PATENT DOCUMENTS

| | | | |
|---|---|---|---|
| 5,229,538 A | 7/1993 | McGlynn et al. | |
| 5,317,693 A * | 5/1994 | Cuenod ................. | G06F 9/4411 370/257 |
| 5,325,359 A | 6/1994 | Jordan et al. | |
| 6,256,354 B1 * | 7/2001 | Yoshida ............... | H04B 14/068 375/219 |
| 7,529,229 B1 * | 5/2009 | Norrell ............... | H04L 12/5692 370/352 |
| 7,908,481 B1 * | 3/2011 | Donzis .............. | H04L 29/12367 380/227 |

(Continued)

OTHER PUBLICATIONS

International Search Report and Written Opinion issued for PCT/US2015/051752 dated Nov. 27, 2015, 10 pgs.

*Primary Examiner* — Faisal M Zaman (57) ABSTRACT

A multi-channel, selectable identity tagging (MCSIT) data translator includes a word monitor port and a channel identifier (ID) tagger. The word monitor port is configured to receive a word generated by a specified one of a plurality of controllable components. The word includes no identifying information for the specified controllable component. The word monitor port is also configured to generate a channel ID corresponding to the specified controllable component and a word type corresponding to the word. The channel ID tagger is configured to determine whether to tag the word with the channel ID based on the word type and, based on the determination, to generate a processed word.

20 Claims, 4 Drawing Sheets

(56) References Cited

U.S. PATENT DOCUMENTS

| | | | |
|---|---|---|---|
| 2004/0133721 A1* | 7/2004 | Ellerbrock | G06F 13/387 710/104 |
| 2004/0240446 A1* | 12/2004 | Compton | H04L 45/00 370/389 |
| 2005/0114525 A1* | 5/2005 | Vimpari | H04L 29/12009 709/228 |
| 2005/0122950 A1* | 6/2005 | Ikeda | H04W 72/1289 370/345 |
| 2008/0082707 A1* | 4/2008 | Gupta | G06F 13/364 710/110 |
| 2009/0116579 A1* | 5/2009 | Abraham | H04L 12/1854 375/295 |
| 2009/0304052 A1* | 12/2009 | Lassini | H04L 12/403 375/211 |
| 2013/0028135 A1* | 1/2013 | Berman | H04L 12/4625 370/254 |
| 2014/0143447 A1 | 5/2014 | Wu | |
| 2016/0056906 A1* | 2/2016 | Lassini | H04J 3/1694 370/442 |

\* cited by examiner

MULTI-CHANNEL, SELECTABLE IDENTITY TAGGING DATA TRANSLATOR AND METHOD

TECHNICAL FIELD

The present disclosure is directed, in general, to serial data communications and, more specifically, to a multi-channel, selectable identity tagging data translator and method.

BACKGROUND

When data from multiple devices configured in link mode (e.g., SAE-AS5652 Enhanced Bit Rate (EBR) 1553) is streamed through a single serial channel, the remote terminal addresses of the devices are identical. Therefore, a component receiving the data stream is unable to identify which device corresponds to which data. As a result, data analysis at the receiving component is hindered.

SUMMARY

This disclosure provides a multi-channel, selectable identity tagging (MCSIT) data translator and method.

In one embodiment, a MCSIT data translator includes a word monitor port and a channel identifier (ID) tagger. The word monitor port is configured to receive a word generated by a specified one of a plurality of controllable components. The word includes no identifying information for the specified controllable component. The word monitor port is also configured to generate a channel ID corresponding to the specified controllable component and a word type corresponding to the word. The channel ID tagger is configured to determine whether to tag the word with the channel ID based on the word type and, based on the determination, to generate a processed word.

In another embodiment, a system for providing MCSIT data translation includes a rack unit that is configured to provide communication between a controller and a plurality of controllable components. An interface between the rack unit and the controllable components is configured to provide a shared address for each of the controllable components. The rack unit includes a MCSIT data translator that is configured to generate a data stream based on the communication between the controller and the controllable components by replacing the shared address for each of the controllable components with an address unique to the controllable component associated with the communication. The rack unit also includes a data transmission unit that is configured to transmit the data stream to a remote station.

In yet another embodiment, a method for performing MCSIT data translation includes receiving a word from a specified one of a plurality of controllable components. A channel ID corresponding to the specified controllable component is generated. A word type for the word is generated. A determination is made regarding whether to tag the word with the channel ID based on the word type. Based on the determination, a processed word is generated.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
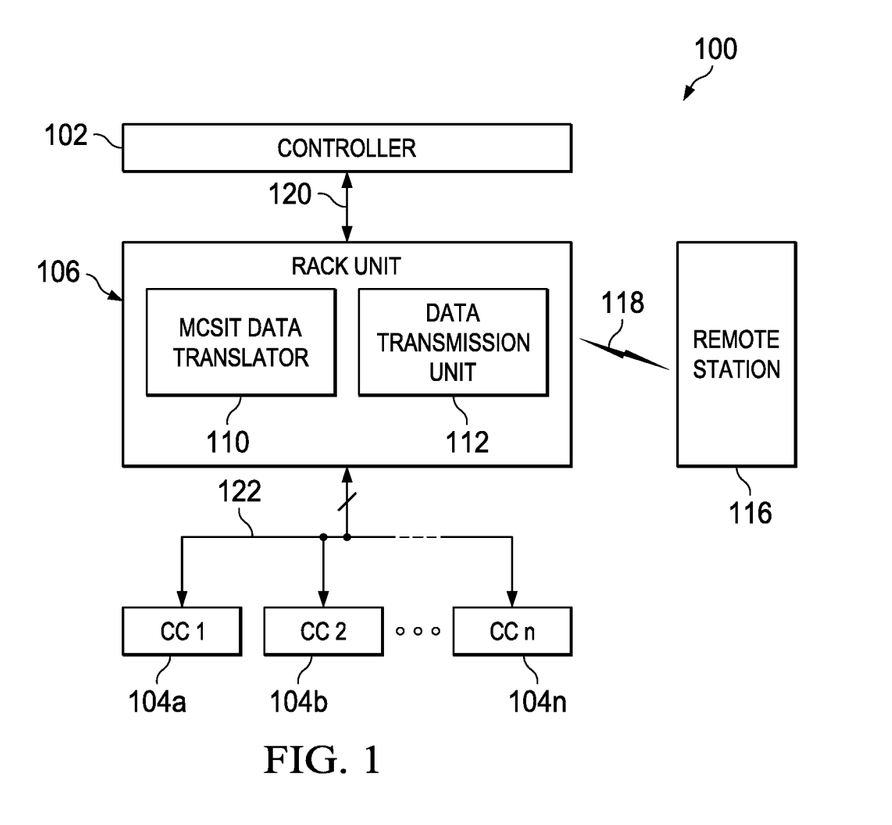
FIG. 1 illustrates a system for providing multi-channel, selectable identity tagging (MCSIT) data translation in accordance with an embodiment of the present disclosure.

FIG. 1 illustrates a system 100 for providing multi-channel, selectable identity tagging (MCSIT) data translation in accordance with an embodiment of the present disclosure. The embodiment of the system 100 shown in FIG. 1 is for illustration only. Other embodiments of the system 100 could be used without departing from the scope of this disclosure.

The system includes a controller 102, a plurality of controllable components (CC 1-CC n) $104_{a-n}$, where n is any suitable integer, and a rack unit 106. The rack unit 106 includes a MCSIT data translator 110 that is configured to provide MCSIT data translation for the system 100, as described in more detail below, and a data transmission unit 112 that is configured to transmit data from the rack unit 106 to a remote station 116 over a wireless interface 118. Although illustrated and described as "remote" and "wireless," respectively, the remote station 116 may include a local receiver, data storage device or data processor within or in the proximity of the rack unit 106, and the wireless interface 118 may include a physical, wired interface.

The rack unit 106 is configured to facilitate communication between the controller 102 and each of the controllable components $104_{a-n}$ by providing a first interface between the controller 102 and the rack unit 106 (i.e., a controller-to-rack interface) over a first bus 120 and a second interface between the rack unit 106 and the controllable components $104_{a-n}$ (i.e., a rack-to-cc interface) over a second bus 122. The rack-to-cc interface is one in which each controllable component $104_{a-n}$ is provided a same address. Thus, for example, the second bus 122 may be configured in link mode in which each controllable component $104_{a-n}$ is provided a same remote terminal (RT) address. For some embodiments, such as the example described in connection with FIG. 2, the first bus 120 may represent a military standard 1553B data bus that can operate at about 1 MB/s, and the second bus 122 may represent a military standard 1553EBR data bus that can operate at about 10 MB/s.

In some situations, the rack unit 106 provides the messages, which include one or more x-bit words, between the controller 102 and the controllable components $104_{a-n}$ to the remote station 116, where x may be 16, 32 or any other suitable integer. For example, during a testing phase for the system 100, these messages may be provided to the remote station 116 for analysis to ensure that the system 100 is functioning as desired. For another example, the messages may be provided to the remote station 116 for backup storage and/or for analysis of the system 100 during normal operations.

Because of the configuration of the rack-to-cc interface, the remote station 116 would be incapable of distinguishing between messages involving each of the different controllable components $104_a$, if the data transmission unit 112 transmitted the internal communications between the rack and the controllable components $104_a$, without modification. For example, if the second controllable component $104_b$ were malfunctioning, the data stream transmitted from the data transmission unit 112 to the remote station 116 would include the message indicating a malfunction; however, because the data stream is serialized and the controllable components $104_{a-n}$ share a same address, the remote station 116 would be unable to identify which of the controllable components $104_{a-n}$ was malfunctioning.

Therefore, the MCSIT data translator 110 is configured to provide identity tagging of the data corresponding to each of the controllable components $104_{a-n}$, thereby allowing the remote station 116 to distinguish between controllable components $104_{a-n}$. The identity tagging provided by the MCSIT data translator 110 is selectable in that certain types of words may be tagged while others remain unmodified. For a particular example, the MCSIT data translator 110 may receive three types of words from the controllable components $104_{a-n}$: command, status and data. For this example, the MCSIT data translator 110 may be configured to provide identity tagging for the command and status words but not for the data words in order to prevent the loss of information stored in the data words.

Although FIG. 1 illustrates one example of a system 100 for providing MCSIT data translation, various changes may be made to the embodiment shown in FIG. 1. For example, the makeup and arrangement of the system 100 are for illustration only. Components could be added, omitted, combined, subdivided, or placed in any other suitable configuration according to particular needs.

Figure 2:
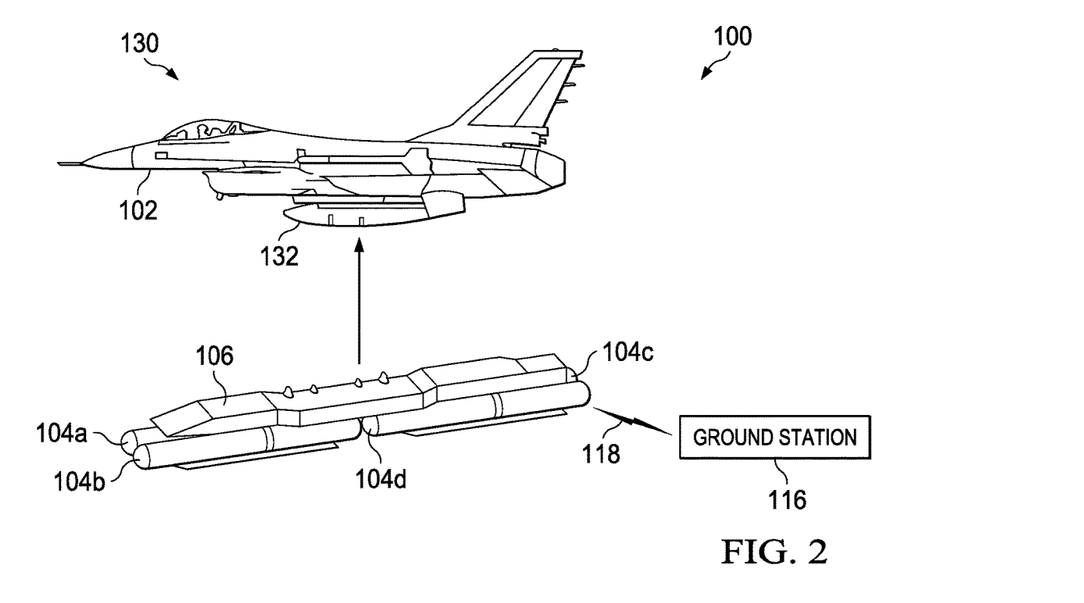
FIG. 2 illustrates the system of FIG. 1 in accordance with a particular embodiment of the present disclosure.

FIG. 2 illustrates the system 100 in accordance with a particular embodiment of the present disclosure. The embodiment of the system 100 shown in FIG. 2 is for illustration only. Other embodiments of the system 100 could be used without departing from the scope of this disclosure.

For this particular embodiment, the controller 102 includes weapons communication technology and the rack unit 106 is coupled to four controllable components $104_{a-d}$, each of which is a weapon. The controller 102 may be configured to operate autonomously and/or to be operated by a pilot of a fighter jet 130, such as an F-35 Joint Strike Fighter, an F-18, or the like. Thus, for example, the weapons communication technology may provide commands to the weapons $104_{a-d}$, monitor the status of the weapons $104_{a-d}$, receive updates from the weapons $104_{a-d}$, or provide any other suitable functionality with regard to the weapons $104_{a-d}$ autonomously. In addition, the pilot may manipulate the weapons communication technology (such as by pressing a button, turning a dial, flipping a switch, or the like) to send commands to, check the status of, or otherwise communicate with the weapons $104_{a-d}$ through the rack unit 106.

For the illustrated embodiment, each weapon $104_{a-d}$ may represent a small diameter bomb or any other suitable type of weapon. The fighter jet 130 may include a bomb bay 132 that is configured to house the rack unit 106 and the weapons $104_{a-d}$. For other embodiments, the rack unit 106 and weapons $104_{a-d}$ may be coupled to the fighter jet 130 in any other suitable manner, such as by being attached under a wing of the fighter jet 130 via a pylon. The remote station 116 in this example is represented by a ground station, which is configured to receive and analyze messages from the rack unit 106 through the wireless interface 118. For some embodiments, the controller 102 may be included in an armed drone or other unmanned vehicle that can be operated by a remotely-located operator at the ground station 116 or any other suitable location.

In this example, the MCSIT data translator 110 (not shown in FIG. 2) is configured to provide selectable identity tagging for digital messages received from the weapons $104_{a-d}$. Also, for this embodiment, the data transmission unit 112 (also not shown in FIG. 2) corresponds to a telemetry unit that is configured to transmit the digital messages that have been processed for selectable identity tagging by the MCSIT data translator 110 to the ground station 116 during flight certification. The transmitted messages may include information relating to strain gauges, pressure transducers, temperature thermocouples and/or any other suitable analog data, along with any other suitable digital communications between the fighter jet 102 and the weapons $104_{a-d}$.

Although FIG. 2 illustrates one particular example of a system 100 for providing MCSIT data translation, various changes may be made to the embodiment shown in FIG. 2. For example, the makeup and arrangement of the system 100 are for illustration only. Components could be added, omitted, combined, subdivided, or placed in any other suitable configuration according to particular needs.

Figure 3:
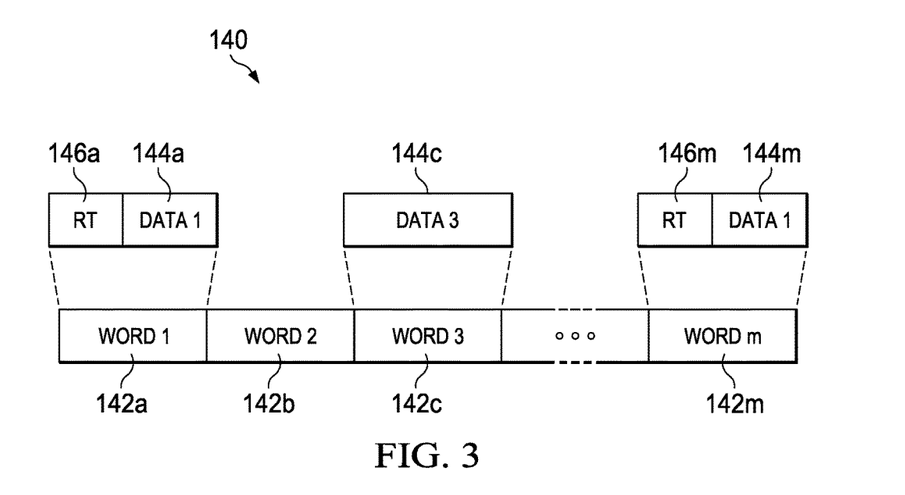
FIG. 3 illustrates a data stream generated by the rack unit of FIG. 1 for transmission to the remote station of FIG. 1 in accordance with an embodiment of the present disclosure.

FIG. 3 illustrates a data stream 140 generated by the rack unit 106 for transmission to the remote station 116 in accordance with an embodiment of the present disclosure. The embodiment of the data stream 140 shown in FIG. 3 is for illustration only. Other embodiments of the data stream 140 could be used without departing from the scope of this disclosure.

For the illustrated embodiment, the data stream 140 includes a plurality of words (Word 1-Word m) $142_{a-m}$, where m is any suitable integer. As described above, for some embodiments, each word $142_{a-m}$ may be a data word or a non-data word, where a non-data word may include a command word or a status word. For example, in the illustrated embodiment, Word 1 $142_a$ and Word m $142_m$ each represent a non-data word and Word 3 $142_c$ represents a data word. Each of the words $142_a$, includes data $144_{a-m}$, with the non-data words 142 including data 144 relating to a command or status and the data words 142 including other forms of data 144, such as data 144 relating to the functioning of the controllable components $104_{a-n}$ or the like.

In addition to data 144, the non-data words 142, such as Word 1 $142_a$ and Word m $142_m$, also include a remote terminal (RT) address 146. The MCSIT data translator 110 is configured to provide selectable identity tagging by identifying non-data words 142 and replacing their shared RT address that does not distinguish between the controllable components $104_a$, with RT addresses 146 that identify the corresponding controllable components $104_{a-n}$. As a result, for example, the RT address $146_a$ may identify which of the controllable components $104_a$, corresponds to the data $144_a$ in Word 1 $142_a$. Similarly, the RT address $146_m$ may identify which of the controllable components $104_a$, corresponds to the data $144_m$ in Word m $142_m$. In this way, the remote station 116 that receives the data stream 140 from the rack unit 106 may be configured to determine which non-data word 142 corresponds to which controllable component 104$_{a-n}$ based on the RT addresses 146 of the non-data words 142.

As shown in FIG. 3, data words 142, such as Word 3 142, include data 144 without address information. As a result, there is no shared RT address to replace in a data word 142. Thus, the replacement of any portion of the word 142 with an RT address 146 could corrupt the data 144. Accordingly, the MCSIT data translator 110 is configured to identify data words 142 and maintain the data 144 in each data word 142 by not overwriting any of the data 144 with an RT address 146.

Although FIG. 3 illustrates one example of a data stream 140 to be transmitted from the rack unit 106 to the remote station 116, various changes may be made to the embodiment shown in FIG. 3. For example, a data stream to be transmitted from the rack unit 106 to the remote station 116 could be formatted in any other suitable configuration.

Figure 4:
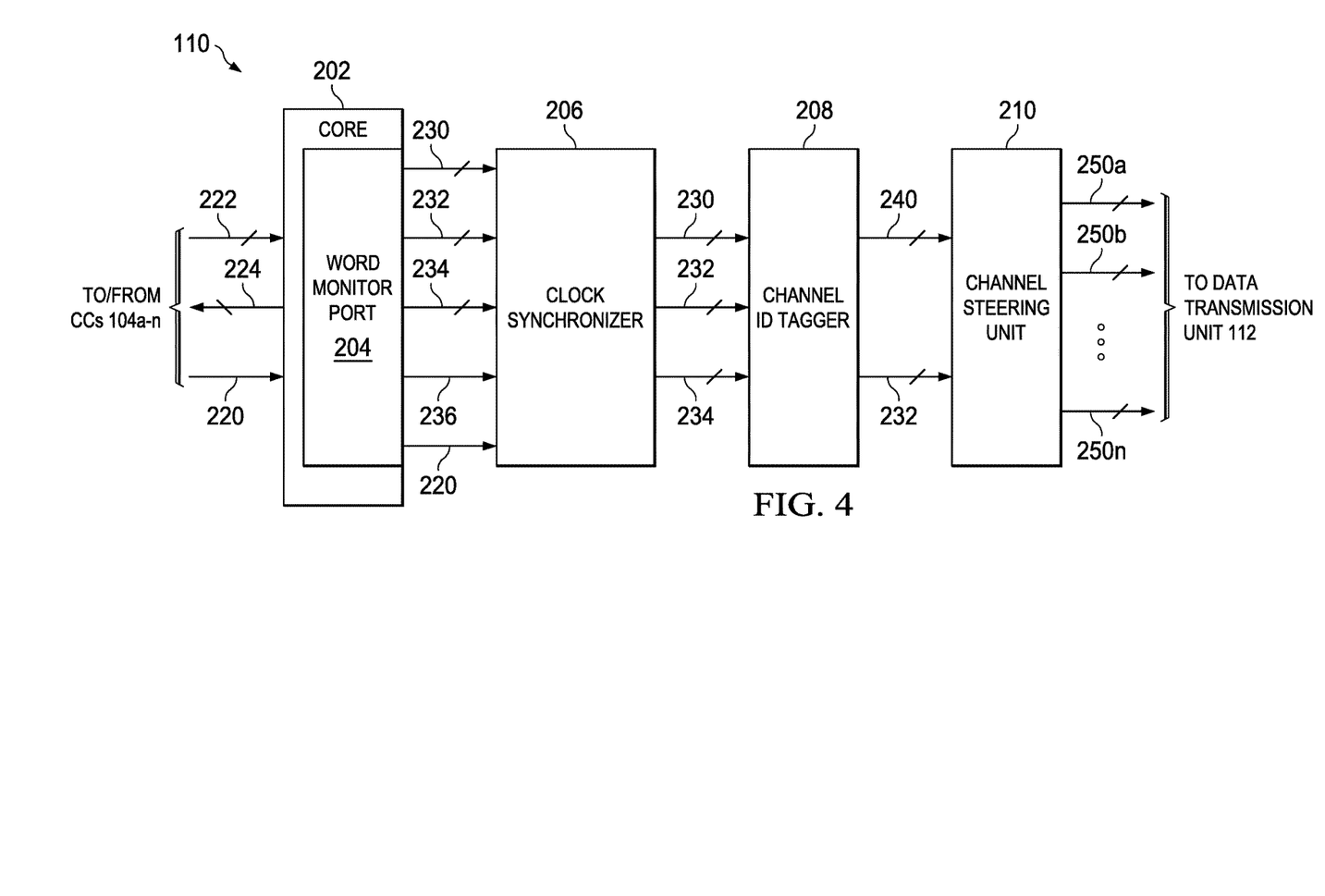
FIG. 4 illustrates details of the MCSIT data translator of FIG. 1 in accordance with an embodiment of the present disclosure.

FIG. 4 illustrates details of the MCSIT data translator 110 in accordance with an embodiment of the present disclosure. The embodiment of the MCSIT data translator 110 shown in FIG. 4 is for illustration only. Other embodiments of the MCSIT data translator 110 could be used without departing from the scope of this disclosure.

For the illustrated embodiment, the MCSIT data translator 110 includes a core 202 with a word monitor port 204, a clock synchronizer 206, a channel identifier (ID) tagger 208, and a channel steering unit 210. The core 202 may represent any suitable information processing (IP) component, such as an extended bit rate (EBR) IP core manufactured by SITAL™. The core 202 is configured to receive a system clock 220 and a plurality of controllable component inputs 222 and to generate a plurality of controllable component outputs 224. For a particular example, the system clock 220 may be a 120 MHz signal. However, it will be understood that the system clock 220 may be any suitable frequency.

Also for a particular example, the core 202 may include four input channels, with each input channel configured to receive one of four controllable component inputs 222 from a corresponding one of four controllable components 104$_{a-d}$. For this example, the core 202 may also include four output channels, with each output channel configured to provide one of four controllable component outputs 224 to a corresponding one of four controllable components 104$_{a-d}$. However, it will be understood that the number of channels for inputs 222 and outputs 224 may correspond to the number n of controllable components 104$_{a-n}$.

The word monitor port 204 is configured to process and analyze incoming words received at the core 202 as controllable component inputs 222. The word monitor port 204 is also configured to provide as outputs a word 230, a channel ID 232, a word type 234, a strobe signal 236 and the system clock 220. Thus, for each word received at the core 202, the word monitor port 204 is configured to pass the word 230 and the system clock 220 to the clock synchronizer 206.

Based on a determination of which input channel is active at the core 202 when a word is received as a controllable component input 222, the word monitor port 204 is also configured to generate the channel ID 232, which identifies which controllable component 104$_{a-n}$ corresponds to the word 230. In addition, the word monitor port 204 is configured to determine what type of word was received. For example, the word monitor port 204 may be configured to determine whether the word is a data word, a command word, or a status word. Based on this determination, the word monitor port 204 is configured to generate the word type 234 that corresponds to the word 230. For a particular example, the channel ID 232 may include five bits and the word type 234 may include two bits. However, it will be understood that the channel ID 232 and the word type 234 may each include any suitable number of bits. When the word 230, the channel ID 232, and the word type 234 for a particular received word are available as outputs from the word monitor port 204, the word monitor port 204 is configured to generate the strobe signal 236 to alert the clock synchronizer 206 that these outputs are available.

The clock synchronizer 206 is configured to synchronize the word 230, channel ID 232 and word type 234 to a different clock regime that is associated with the channel ID tagger 208. For example, the clock synchronizer 206 may be configured to pass these signals from a faster clock regime to a slower clock regime. For the particular example in which the system clock 220 operates at 120 MHz, the clock synchronizer 206 may be configured to synchronize the word 230, channel ID 232 and word type 234 to a clock operating at 60 MHz. After synchronizing the clock, the clock synchronizer 206 is configured to pass the word 230, channel ID 232 and word type 234 to the channel ID tagger 208 at the updated clock regime.

The channel ID tagger 208 is configured to determine whether to modify the word 230 based on the word type 234 and, based on the determination, to generate a processed word 240 as an output. For example, if the word type 234 indicates that the word 230 is a data word, the channel ID tagger 208 may be configured to make a determination not to modify the word 230. In this case, the channel ID tagger 208 is configured to pass the word 230 unchanged as the processed word 240 to the channel steering unit 210.

However, if the word type 234 indicates that the word 230 is a command word or status word (i.e., a non-data word), the channel ID tagger 208 may be configured to make a determination to modify the word 230. In this case, the channel ID tagger 208 is configured to overwrite the shared address in the word 230 with the channel ID 232 to generate the processed word 240. In this way, the channel ID tagger 208 is configured to include an identification of the channel on which the non-data word 230 was received and, thus, the controllable component 104$_a$, corresponding to that word 230. The channel ID tagger 208 is also configured to pass the channel ID 232 to the channel steering unit 210.

The channel steering unit 210 is configured to receive the processed word 240 and the channel ID 232 and to steer the processed word 240 to a particular channel output 250$_{a-n}$ based on the channel ID 232, with n corresponding to the number of controllable components 104$_{a-n}$. Thus, for the example described above in which the core 202 is configured to receive data from, and provide data to, four controllable components 104$_{a-d}$, the channel steering unit 210 may be configured to steer the processed word 240 to one of four channel outputs 250$_{a-d}$.

For some embodiments, the channel steering unit 210 may include multiplexer logic that is configured to steer the processed word 240 into a particular word buffer by outputting the processed word 240 through a corresponding one of the channel outputs 250$_{a-n}$. For a particular example, the data transmission unit 112 may be unable to receive all n channels of data in a parallel format. Therefore, the channel steering unit 210 may provide the parallel channel outputs 250$_{a-n}$ to channel buffers and a serial formatter, which may re-format the data into a serial format for the data transmission unit 112. For a particular example, the channel steering unit 210 may be configured to steer the processed word 240 into one of n FIFOs for buffering, after which a data stream including the processed word 240 may be formatted and passed asynchronously to a serial input of the data transmission unit 112, which transmits the data stream to the remote station 116. Thus, although the illustrated embodiment indicates that the channel outputs $250_{a-n}$ are provided to the data transmission unit 112, it will be understood that additional processing may occur between the channel steering unit 210 and the data transmission unit 112.

Although FIG. 4 illustrates one example of a MCSIT data translator 110, various changes may be made to the embodiment shown in FIG. 4. For example, the makeup and arrangement of the MCSIT data translator 110 are for illustration only. Components could be added, omitted, combined, subdivided, or placed in any other suitable configuration according to particular needs.

Figure 5:
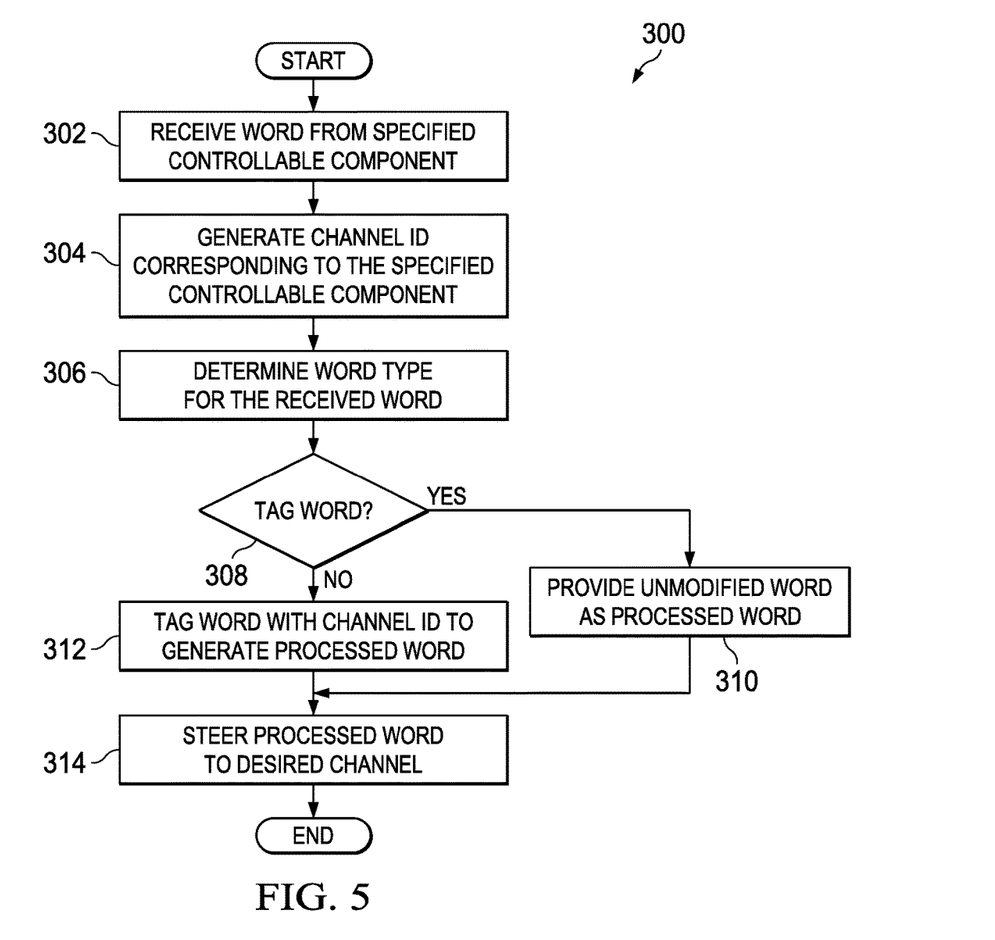
FIG. 5 is a flowchart illustrating a method for performing MCSIT data translation in accordance with an embodiment of the present disclosure.

FIG. 5 is a flowchart illustrating a method 300 for performing MCSIT data translation in accordance with an embodiment of the present disclosure. The method 300 shown in FIG. 5 is for illustration only. MCSIT data translation may be performed in any other suitable manner without departing from the scope of this disclosure.

Initially, a word 230 is received from a specified one of a plurality of controllable components 104 (step 302). As a particular example, in some embodiments, the word 230 is received at a controllable component input 222 of a core 202. A channel ID 232 that corresponds to the specified controllable component 104 is generated (step 304). As a particular example, in some embodiments, a word monitor port in the core 202 generates the channel ID 232 based on which channel is active at the core 202 when the word 230 is received.

A word type 234 is determined for the received word 230 (step 306). As a particular example, in some embodiments, the word monitor port 204 determines whether the word 230 is a command word, a status word or a data word. A determination is made as to whether or not to tag the word 230 (step 308). As a particular example, in some embodiments, a channel ID tagger 208 determines whether or not to tag the word 230 based on the word type 234.

If the determination is made not to tag the word 230 (step 308), the word 230 is provided without modification as a processed word 240 (step 310). As a particular example, in some embodiments, if the word type 234 corresponds to a data word, the channel ID tagger 208 determines not to tag the word 230 and passes the word 230 unmodified as the processed word 240 to a channel steering unit 210.

If the determination is made to tag the word 230 (step 308), the word 230 is tagged with the channel ID 232 to generate the processed word 240 (step 312). As a particular example, in some embodiments, if the word type 234 corresponds to a command word or a status word (i.e., a non-data word), the channel ID tagger 208 determines to tag the word 230 and replaces the shared address of the word 230 with the channel ID 232 to generate the processed word 240 for the channel steering unit 210. For example, the channel ID 232 may be provided as an identifying RT address 146 in the word 230.

The processed word 240 is steered to a desired channel for transmission to a remote station 116 by a data transmission unit 112 (step 314). As a particular example, in some embodiments, the channel steering unit 210 steers the processed word 240 into one of n FIFOs for buffering, after which a data stream 140 including the processed word 240 is formatted and passed asynchronously to a serial input of the data transmission unit 112, which transmits the data stream 140 to the remote station 116.

Although FIG. 5 illustrates one example of a method 300 for performing MCSIT data translation, various changes may be made to the embodiment shown in FIG. 5. For example, while shown as a series of steps, various steps in FIG. 5 could overlap, occur in parallel, occur in a different order, or occur multiple times. In addition, for a particular example, in some embodiments, the clock regime may be modified before a determination is made regarding whether or not to tag the word 230.

Modifications, additions, or omissions may be made to the apparatuses and methods described here without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A multi-channel, selectable identity tagging (MCSIT) data translator, comprising:
    a word monitor port configured to:
        receive a word generated by a specified one of a plurality of controllable components, wherein the word comprises a shared address that does not distinguish between the controllable components and that contains no identifying information for the specified controllable component; and
        generate a channel identifier (ID) uniquely identifying the specified controllable component and a word type corresponding to the word; and
    a channel ID tagger configured to determine whether to tag the word with the channel ID based on the word type and, based on the determination, to generate a processed word.

2. The MCSIT data translator of claim 1, wherein:
    the word type comprises one of a command word, a status word and a data word,
    when the word type comprises one of a command word and a status word, the channel ID tagger is configured to determine to tag the word with the channel ID to generate the processed word, and when the word type comprises a data word, the channel ID tagger is configured to determine not to tag the word with the channel ID and to provide the word unmodified as the processed word.

3. The MCSIT data translator of claim 2, wherein the channel ID tagger is configured to tag the word with the channel ID by overwriting the shared address in the word with the channel ID.

4. The MCSIT data translator of claim 1, further comprising a channel steering unit configured to steer the processed word to one of a plurality of channel outputs based on the channel ID.

5. The MCSIT data translator of claim 1, wherein:
the word monitor port is provided in an information processing (IP) core,
the IP core comprises a plurality of input channels, each of the input channels configured to receive words from a corresponding one of the controllable components, and
the word monitor port is configured to generate the channel ID based on which of the input channels is active when the word is received.

6. The MCSIT data translator of claim 5, wherein:
the IP core is configured to operate at a first frequency and the channel ID tagger is configured to operate at a second frequency,
the word monitor port is configured to provide the words, corresponding channel IDs and corresponding word types at the first frequency, and
the MCSIT data translator further comprises a clock synchronizer configured to receive the words, the channel IDs and the word types at the first frequency, to synchronize the words, the channel IDs and the word types to the second frequency, and to pass the words, the channel IDs and the word types at the second frequency to the channel ID tagger.

7. The MCSIT data translator of claim 6, wherein the first frequency comprises 120 MHz and the second frequency comprises 60 MHz.

8. A system for providing multi-channel, selectable identity tagging (MCSIT) data translation, comprising:
a rack unit configured to provide communications between a controller and a plurality of controllable components, wherein an interface between the rack unit and the controllable components is configured to provide a shared address for the controllable components that does not distinguish between the controllable components, and wherein the rack unit comprises:
a MCSIT data translator configured to generate a data stream based on a communication from a specified one of the controllable components to the controller by replacing the shared address for the controllable components with an address unique to the specified controllable component; and
a data transmission unit configured to transmit the data stream to a remote station.

9. The system of claim 8, wherein the MCSIT data translator comprises:
a word monitor port configured to receive a word generated by the specified controllable component and to generate a channel identifier (ID) corresponding to the specified controllable component and a word type corresponding to the word; and
a channel ID tagger configured to determine whether to tag the word with the channel ID based on the word type and, based on the determination, to generate a processed word, wherein the channel ID corresponds to the address unique to the specified controllable component.

10. The system of claim 9, wherein:
the word type comprises one of a command word, a status word and a data word,
when the word type comprises one of a command word and a status word, the channel ID tagger is configured to determine to tag the word with the channel ID to generate the processed word, and
when the word type comprises a data word, the channel ID tagger is configured to determine not to tag the word with the channel ID and to provide the word as the processed word.

11. The system of claim 10, wherein the channel ID tagger is configured to tag the word with the channel ID by overwriting the shared address in the word with the channel ID.

12. The system claim 9, wherein the MCSIT data translator further comprises a channel steering unit configured to steer the processed word to one of a plurality of channel outputs based on the channel ID for transmission to the remote station by the data transmission unit.

13. The system of claim 9, wherein:
the MCSIT data translator further comprises a clock synchronizer,
the word monitor port is provided in an information processing (IP) core,
the IP core comprises a plurality of input channels, each of the input channels configured to receive words from a corresponding controllable component,
the word monitor port is configured to generate the channel ID based on which of the input channels is active when the word is received,
the IP core is configured to operate at a first frequency and the channel ID tagger is configured to operate at a second frequency,
the word monitor port is configured to provide the words, corresponding channel IDs and corresponding word types to the clock synchronizer at the first frequency, and
the clock synchronizer is configured to synchronize the words, the channel IDs and the word types to the second frequency and to pass the words, the channel IDs and the word types at the second frequency to the channel ID tagger.

14. The system of claim 13, wherein the first frequency comprises 120 MHz and the second frequency comprises 60 MHz.

15. The system of claim 8, wherein the controllable components comprise weapons and the interface is configured in a link mode.

16. A method for performing multi-channel, selectable identity tagging data translation, comprising:
receiving a word from a specified one of a plurality of controllable components, wherein the word comprises a shared address that does not distinguish between the controllable components and that contains no identifying information for the specified controllable component;
generating a channel identifier (ID) corresponding to the specified controllable component, the channel ID uniquely identifying the specified controllable component;
identifying a word type for the word;

determining whether to tag the word with the channel ID based on the word type; and based on the determination, generating a processed word.

17. The method of claim 16, wherein:
the word type comprises one of a non-data word and a data word, determining whether to tag the word with the channel ID based on the word type comprises (i) determining to tag the word with the channel ID when the word type comprises a non-data word and (ii) determining not to tag the word with the channel ID when the word type comprises a data word, and generating the processed word comprises (i) tagging the word with the channel ID to generate the processed word when the determination is made to tag the word and (ii) providing the word unmodified as the processed word when the determination is made not to tag the word.

18. The method of claim 17, wherein tagging the word with the channel ID comprises overwriting the shared address in the word with the channel ID.

19. The method of claim 16, further comprising steering the processed word to one of a plurality of channel outputs based on the channel ID.

20. The method of claim 16, further comprising synchronizing multiple words, corresponding channel IDs and corresponding word types from a first frequency to a second frequency.

* * * * *